June 11, 1963 F. L. CHURCHMAN 3,092,857
WATER SLED
Filed April 23, 1962 2 Sheets-Sheet 1
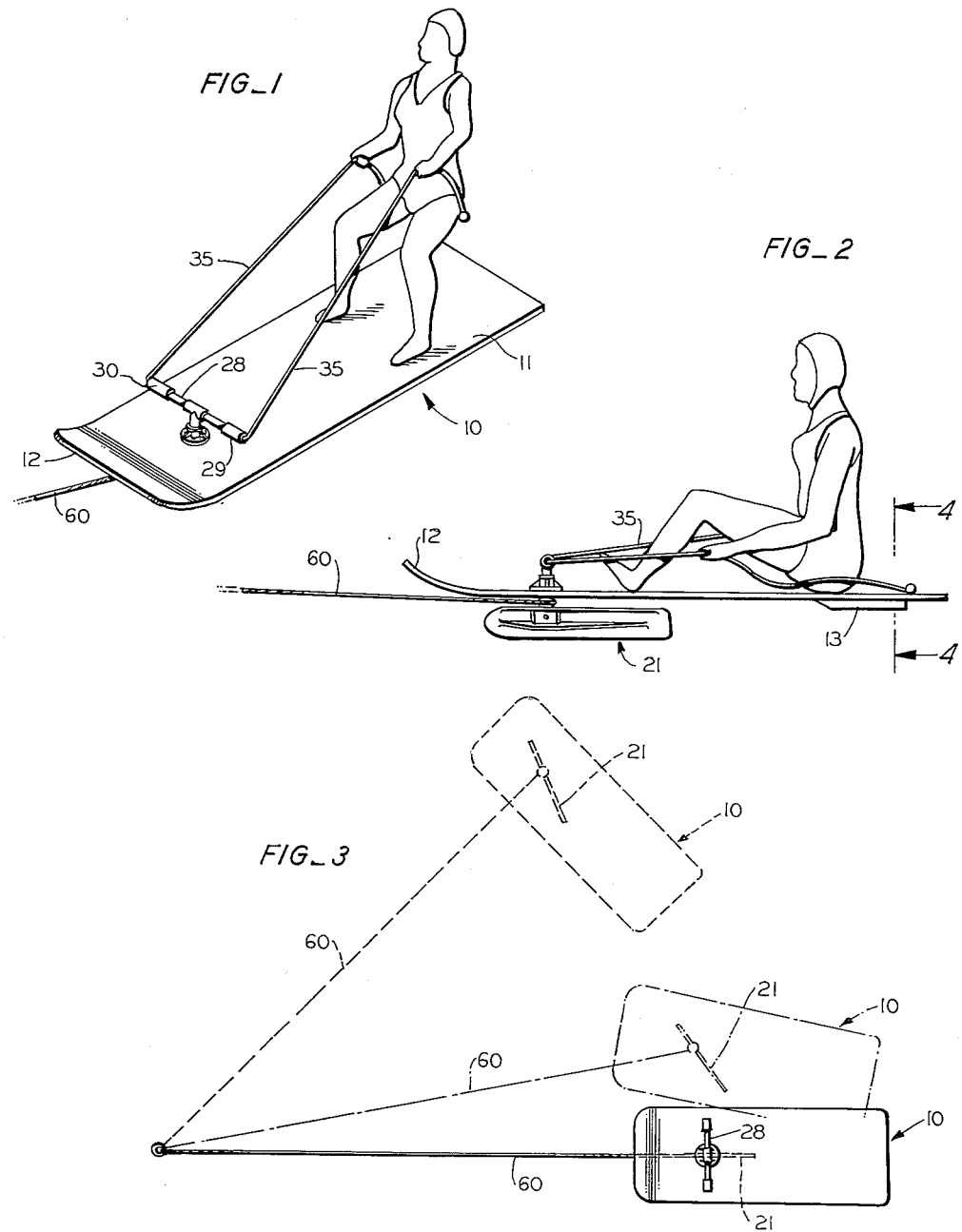
INVENTOR.
FRED L. CHURCHMAN
BY
Gordon Wood.
ATTORNEY June 11, 1963     F. L. CHURCHMAN     3,092,857
WATER SLED
Filed April 23, 1962     2 Sheets-Sheet 2
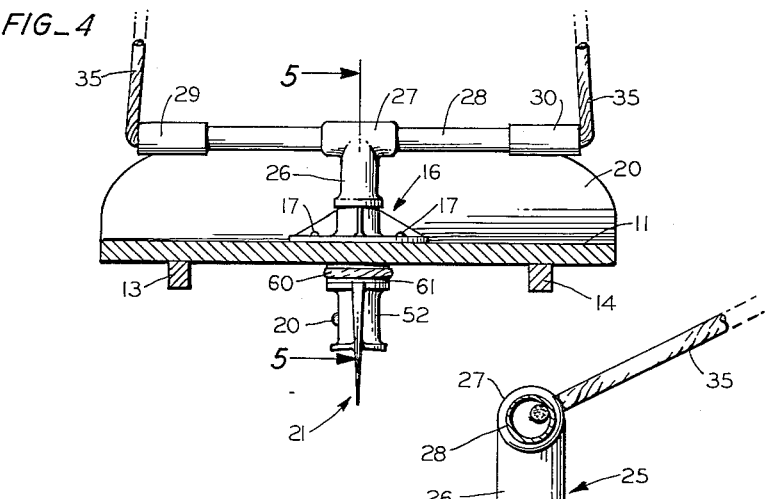
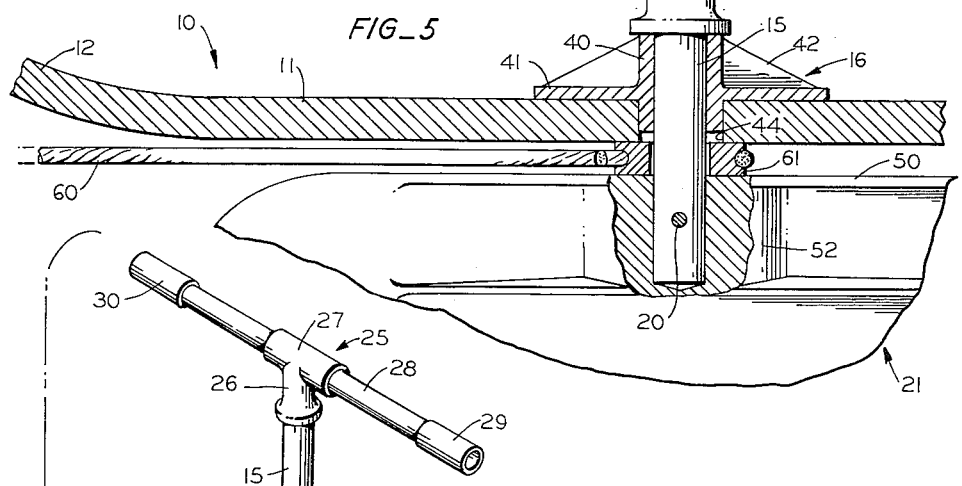
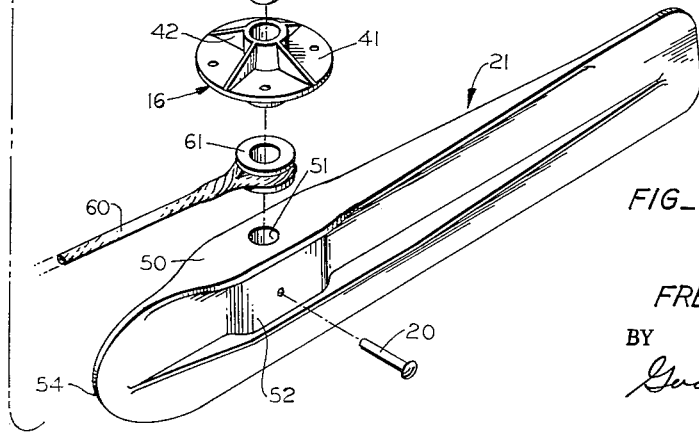
INVENTOR.
FRED L. CHURCHMAN
BY
Gordon Wood
ATTORNEY United States Patent Office 3,092,857
Patented June 11, 1963

3,092,857
WATER SLED
Fred L. Churchman, Box 81, Benicia, Calif.
Filed Apr. 23, 1962, Ser. No. 189,593
5 Claims. (Cl. 9—310)

This application is a continuation in part of application Serial No. 17,676 filed March 25, 1960, now abandoned.

The invention relates to a water sled of the type adapted to be towed by a power driven boat.

The primary object of the invention is the provision of a water sled having improved towing and steering apparatus to increase the maneuverability of the sled and thus add to the enjoyment of its use as a sport.

Another object of the invention is the provision of a water sled which incorporates a simplified steering apparatus and towing connection permitting the sled to be shipped in a disassembled condition and then assembled in a matter of minutes by the user.

Still another object of the invention is the provision of a water sled including steering means which permits the rider to assume a prone, standing or sitting position on the sled as desired and at the same time keep the sled under control, thereby adding to the enjoyment of the sport.

Other objects and advantages of this invention will be apparent from the following description and from the drawings wherein:

FIG. 1 is a perspective of a water sled incorporating the present invention and showing the same pulled by a tow rope with rider standing thereon and holding the ends of the steering rope;

FIG. 2 is a side elevation of the water sled showing a rider in a sitting position thereon and holding the ends of the steering rope;

FIG. 3 is a schematic top plan view partly in full lines and partly in phantom lines illustrating right hand steered maneuvers of the water sled from a straight line of travel produced by rotating the steering mechanism out of its intermediate or neutral position.

FIG. 4 is an enlarged vertical transverse section taken along the lines 4—4 of FIG. 2.

FIG. 5 is a greatly enlarged fragmentary vertical longitudinal sectional view taken on the lines 5—5 of FIG. 4.

FIG. 6 is an exploded perspective view of the steering assembly.

In detail, and first with reference to FIG. 1, the invention shown in connection with a water sled generally designated 10 and of somewhat simplified design which includes a main body portion 11 and a forward upturned bow portion 12. Adjacent the stern of the sled the same is provided with a pair of transversely spaced stabilizing rudders or ribs 13, 14 (FIG. 4). It will be understood that the particular form of the sled shown is for illustrative purposes only and the same may take various shapes as contemplated by the present invention. For example, the sled may be formed with sides and with the central portion of the body hollowed out to receive the rider therein. In the present description the terms planing board and planing body will be employed to identify contemplated variants of the sled indicated at 10 in FIG. 1.

A steering post 15 extends vertically through the main body portion 11 of the sled as best seen in FIG. 5. Said steering post is rotatably supported in a bearing 16 which may be fixably secured to the sled by means of screws 17 (FIG. 4). The steering post 15 is fixedly secured at its lower end by means of a pin 20 to a steering rudder generally designated 21.

The upper end of the steering post 15 is received within a socket member 25 which is generally T-shaped having a depending portion 26, within which the steering post is received, and a horizontally extending run 27. A horizontally extending steering bar 28 is received through the horizontal portion 27 of the socket member 25 and said bar is provided at its ends with grips 29, 30 adapted to be grasped by the hands of the rider. Extending through the steering bar 28 is a steering rope 35 which may be employed by the rider when the latter is riding the sled in a standing position as shown in FIG. 1 or in a sitting position as shown in FIG. 2. The rider may also lie flat on the water sled in which case he can grasp the hand grips 29, 30. Such a prone position of the rider is not shown on the drawings.

Referring now to FIG. 5 and FIG. 6, the bearing generally designated 16 includes a vertically extending tubular portion 40, through which the steering rod is received, and an integral horizontally extending flange portion 41 which is adapted to be secured by means of screws 17 (FIG. 4) to the central portion 11 of the water sled. A plurality of stiffening brackets 42 may be provided for integrally connecting the tubular portion 40 and the horizontal flange portion 41. The tubular portion 40 extends downwardly into an opening 44 provided in the body portion 11 of the sled.

As best seen in FIG. 6 the steering rudder 21 comprises a vertically disposed elongated foil provided at its upper edge with a horizontally disposed flange portion 50 through which is drilled a vertically extending hole 51 for receiving the steering post 15 therein. The foil is thickened to provide a boss 52 at the portion of the foil which is formed with the hole 51. A pin 20 is received through boss portion 51 and through a complementarily formed hole in the steering rod 15. By this structure the steering rod is fixedly secured and rotates with the foil 21. It will be noted that the post 15 is secured to the foil at about the third point of the latter. That is, the distance between hole 51 and forward end 54 of the foil is about one third the total length of the foil 21. It has been found that these proportions give optimum maneuverability to the sled.

For the purpose of towing the sled a tow rope 60 is seized in the usual manner as seen in FIG. 6 to a swivel ring 61 which is rotatably supported on steering post 15 and interposed between foil 21 and the underside of the body portion 11 of the sled.

The above described structure not only provides a simplified assembly of the steering mechanism and the towing connection, but also results in desirable advantages as far as the riding qualities of the water sled and its maneuverability is concerned. Thus as seen in FIG. 3 a clockwise movement of the steering bar 28 results in the sled being moved to the right of the straight line path of travel indicated by the full line position of FIG. 3. An abrupt movement of the sled to the right may be effected by further rotation of the steering bar 27 in a clockwise direction. It will be noted that when the sled is laterally offset to an extreme degree as shown in FIG. 3 it is free from the wash of the towing boat and an abrupt change in position across the wash to the opposite side may be effected by rotating the steering bar 28 in a counterclockwise direction.

The fact that the towing point is below the body of the sled increases the effectiveness of the assembly and prevents strains being built up in the sled at undesirable points.

It will be also noted that the above described structure lends itself to packaging in a simple package in a knocked down condition so that the purchaser may assemble the entire sled in a matter of a few minutes.

It will be understood that the above very specific description of the preferred form of the invention should not be taken as restrictive of the scope of the invention as various modifications in design will occur to those skilled in the art without departing from the scope of the following claims.

I claim:

1. A water sled comprising a planing board having forward and rear ends, a steering assembly on a forward part of said board, said assembly comprising a longitudinally elongated steering foil located beneath the forward part of the board, means mounting the foil for rotation on a vertical axis to opposite sides of an intermediate position of alignment with the longitudinal centerline of the board, and a steering bar located above the board and operatively connected to the steering foil, a forwardly extending towrope beneath the forward part of the board, and means pivotally connecting the towrope at its rear end on said assembly on the axis of rotation of the steering foil, said assembly comprising a vertically steering shaft having a lower end fixed to the steering foil and upstanding therefrom, said board being formed with an opening, said steering shaft extending upwardly through said opening and having an upper end above the board, said pivot means being a ring journaled on the steering shaft, steering bar connecting means secured on the steering shaft above the board, said connecting means comprising a socket secured over the upper end of the steering shaft, the steering bar being fixed to the socket, and said towrope bar ring being disposed between the steering foil and the underside of the board.

2. A water sled comprising:
a planing body adapted to be supported on the water and provided with front and rear ends,
a steering rudder,
a vertically extending steering post extending downwardly through said body at the forward portion thereof and secured at its lower end to said rudder,
means rotatably mounting said post to said body for swingably mounting said rudder relative to said body,
a towrope connector,
means swingably securing said connector to said post below said body to permit towing said body by means of a tow rope at various angles as desired relative to the central longitudinal axis of said body.

3. A water sled according to claim 3 wherein a steering bar is carried by said post at a point above said body to permit swinging of said rudder by means of said bar.

4. A water sled according to claim 2 wherein said tow rope connector comprises a ring surrounding said post and interposed between said body and said rudder.

5. A water sled comprising a horizontally disposed planing body adapted to be supported on the water and provided with front and rear ends,
a steering post extending vertically through said body at the forward portion thereof,
a bearing fixedly secured to said body and supporting said post for rotation about a vertical axis relative to said body,
a steering rudder fixedly secured to the lower end of said post and adapted to swing about a vertical axis in response to rotation of said post,
a towrope connector ring rotatably received on said post intermediate said rudder and the underside of said body and adapted to be connected to a towrope to permit towing said body, and
manually actuatable means connected to the upper end of said post to permit a rider on said body to steer said rudder.

References Cited in the file of this patent
UNITED STATES PATENTS

| | | |
|---|---|---|
| 2,815,518 | Kuehn | Dec. 10, 1957 |
| 2,865,032 | Moody | Dec. 23, 1958 |
| 2,910,708 | Albright | Nov. 3, 1959 |